(12) United States Patent
Huebner et al.

(10) Patent No.: US 6,180,705 B1
(45) Date of Patent: Jan. 30, 2001

(54) POLYACRYLAMIDE WITH LOW MOLECULAR WEIGHT

(75) Inventors: Norbert Huebner, Duesseldorf; Wolf-Ruediger Mueller, Hilden; Bernd Willi Peters, Solingen; Ludwig Schieferstein, Ratingen, all of (DE)

(73) Assignee: Henkel Kommanditgesellschaft auf Aktien, Duesseldorf (DE)

( * ) Notice: Under 35 U.S.C. 154(b), the term of this patent shall be extended for 0 days.

(21) Appl. No.: 09/011,680

(22) PCT Filed: Aug. 5, 1996

(86) PCT No.: PCT/EP96/03451

§ 371 Date: Feb. 13, 1998

§ 102(e) Date: Feb. 13, 1998

(87) PCT Pub. No.: WO97/07162

PCT Pub. Date: Feb. 27, 1997

(30) Foreign Application Priority Data

Aug. 14, 1995 (DE) .............................................. 195 29 965

(51) Int. Cl.[7] .............................. C08L 93/04; C08K 5/05; C09J 133/26; C08F 220/56

(52) U.S. Cl. ..................... 524/272; 156/327; 156/331.6; 156/331.8; 427/397; 427/421; 427/429; 523/150; 524/379; 524/385; 524/386; 526/303.1; 526/307.4; 526/307.6; 526/307.7

(58) Field of Search .............................. 526/303.1, 307.4, 526/307.6, 307.7; 524/272, 379, 385, 386; 523/150; 156/327, 331.6, 331.8; 427/397.7, 421, 429

(56) References Cited

U.S. PATENT DOCUMENTS

| | | | |
|---|---|---|---|
| 2,486,191 | * 11/1949 | Minsk et al. | 526/303.1 |
| 4,314,044 | * 2/1982 | Hughes | 526/303.1 |
| 4,328,141 | 5/1982 | Farewell et al. | 524/272 |
| 4,658,000 | * 4/1987 | Tyihak et al. | 156/331.8 |
| 4,711,919 | * 12/1987 | Peppmoller et al. | 524/272 |
| 4,980,024 | * 12/1990 | Payne et al. | 427/397.7 |
| 5,672,199 | 9/1997 | Gossen et al. | 106/36 |

FOREIGN PATENT DOCUMENTS

| | | |
|---|---|---|
| 27 38 872 | 3/1979 | (DE) . |
| 43 39 642 | 5/1995 | (DE) . |
| 1 568 115 | 5/1980 | (GB) . |

OTHER PUBLICATIONS

Austenal Laboratories, Incorporated v. Nobilium Processing Company of Chicago et al. (DC N.ILL) 115 USP Q 44, Jun. 1957.*

Petrolite Corporation v. Watson, Comr. Pats. (DC DC) 113 USP Q 248, Mar. 1957.*

Duval et al, "Dynamical studies on low molecular weight polyacrylamide aqueous solution",Polymer 26(3): 397–405 (Mar. 1985).

Encyclopedia of Polymer Science and Engineering, 2nd.ed., John Wiley & Sons, vol. 17: 730–84 (1989).

* cited by examiner

Primary Examiner—Peter A. Szekely
(74) Attorney, Agent, or Firm—Wayne C. Jaeschke; Stephen D. Harper; Glenn E. J. Murphy

(57) ABSTRACT

The invention concerns a polyacrylamide-containing composition which is characterized in that it has a molecular weight of between 2,000 and 8,000 g/mol, determined by means of gel permeation chromatography (GPC), and as a 15% aqueous solution still has a Brookfield viscosity of between 100 and 500 mPas at 25° C. The invention further concerns the use of this polyacrylamide-containing composition for the flat bonding of water absorbent and hard surfaces and for equipping plastic surfaces with non-slip protection.

13 Claims, No Drawings

POLYACRYLAMIDE WITH LOW MOLECULAR WEIGHT

This invention relates to a polyacrylamide-containing adhesive composition having a lower molecular weight than corresponding commercially available adhesive compositions, to a process for the production of such an adhesive composition and to its use in surface bonding processes.

BACKGROUND OF THE INVENTION

DE-OS 43 39 642 describes antislip formulations, i.e. formulations which prevent two articles from unintentionally sliding in relation to one another, which consist of at least one colophony resin and/or a derivative thereof, at least one monohydric or polyhydric alcohol, a water-soluble or water-dispersible thinning agent optionally a propellent and optionally a thickener and—for the rest—water.

It is known from "Encyclopedia of Polymer Science and Engineering", 2nd Edition, Vol. 17, John Wiley & Sons, New York, 1989, pages 730–784, more particularly pages 753 et seq., that polyacrylamide is used in adhesive compositions, more particularly in the paper industry by virtue of its dry strength and in the building industry as a laminate adhesive. Unfortunately, the disadvantage of applying such adhesive polymers in the form of an aqueous solution is the high viscosity of such compositions. This is attributable to the high molecular weight typical of the polymer which in turn is responsible for the mechanical strength subsequently required. Experience has shown that an excessive reduction in molecular weight leads to a considerable reduction in the strength of the bond.

DETAILED DESCRIPTION OF THE INVENTION

The problem addressed by the present invention was to provide a new polyacrylamide-containing adhesive composition which would not have the above-mentioned disadvantages of a high viscosity, but which at the same time would show comparable mechanical strength.

This problem has been solved by the characterizing features of claim 1.

Accordingly, the present invention relates to a polyacrylamide-containing adhesive composition which is characterized in that it contains a polyacrylamide with a very low molecular weight of 2,000 to 8,000 g/mole and preferably 3,500 to 5,000 g/mole, as determined by gel permeation chromatography (GPC), and in that the polyacrylamide has a Brookfield viscosity of 5 to 500 mPas in the form of a 15% by weight aqueous solution at 25° C.

In one preferred embodiment, the polyacrylamide-containing compositions contain viscosity-regulating additives, for example water and/or monohydric or polyhydric alcohols, which are preferably liquid and evaporate from the adhesive system at 25° C. in accordance with practical requirements. One particular embodiment is characterized by the use of alcohols with a solubility of more than 3 g in 100 g of water at 25° C. These alcohols may be aliphatic or cycloaliphatic, saturated or unsaturated alcohols with a linear or branched chain. They may also contain other hetero atoms, for example oxygen in the form of an ether group.

Examples are ethanol, n-propanol, i-propanol, butanol, benzyl alcohol, cyclohexanol, di-, tri- and polyethylene glycol. Dihydric and trihydric alcohols are preferred, ethane-1,2-diol, propane-1,2-diol and/or propane-1,2,3-triol (glycerol) being particularly preferred.

The above-mentioned additives may consist both of pure water and of alcohols. This additive is present in the polyacrylamide-containing composition according to the invention in a quantity of generally 50 to 95% by weight and preferably 75 to 90% by weight. In one preferred embodiment and providing the polyacrylamide-composition is applied to a water-absorbing surface, an additive mixture of water and 5 to 30% by weight and preferably 5 to 15% by weight of an alcohol, preferably glycerol, is used so that excessive waving of the paper coated with the polyacrylamide composition is avoided. The pot life can be adjusted to between 1 and 360 minutes depending on the quantity of glycerol used, i.e. 5 to 45% by weight and preferably 10 to 30% by weight, based on the polyacrylamide composition.

In addition, a tackifier is also added to the polyacrylamide-containing compositions according to the invention, colophony resin with an average molecular weight below 2,000 g/mole being particularly mentioned in this regard. Colophony resin is obtained, for example, from the crude resin of conifers. It consists predominately of unsaturated carboxylic acids with the empirical formula $C_{20}H_{30}O_2$, such as abietic acid and isomers thereof. However, more or less neutral substances, such as fatty acid esters, terpene alcohols and hydrocarbons, may also be present. A derivatized colophony resin is preferably used, for example a hydrogenated or disproportionated colophony resin, the object of the derivatization (for example saponification or addition of maleic acid) being above all to increase solubility in water. Useful colophony resins and derivatives thereof are balsam, tall oil and wood resins. Water-soluble balsam resin derivatives with a solubility of at least 3 g in 100 g of water at 25° C., which are marketed under the name of "Flexin® D", are particularly suitable. Water-soluble colophony derivatives, more particularly saponified derivatives, are preferably used.

Suitable thinning agents—another sub-group of additives—are alkali metal or alkaline earth metal benzene sulfonates containing up to 18 and, more particularly, 1 to 4 carbon atoms in the alkyl group, but especially the sodium salt of propyl benzene sulfonate.

In addition, it is also possible—providing the polyacrylamide compositions according to the invention are to be used for spraying, but are not to be sprayed by means of a mechanical pump spray—to use a propellent selected, for example, from the usual hydrocarbon propellent gases known per se, such as propane, butane or mixtures thereof, which are optionally used together with ethanol or dimethyl ether. Carbon dioxide may also be used to spray the polyacrylamide compositions.

In addition, there are various other auxiliaries and additives, for example dyes and light stabilizers.

In the context of the present invention, the term "polyacrylamide" is mainly intended to apply to copolymers containing acrylamide and, in the extreme case, to polyacrylamide itself. These polyacrylamides have a copolymer content of up to 15% by weight and, more particularly, up to 5% by weight. Acrylamide-containing copolymers are understood to be cationic polyelectrolytes with which water-soluble polymers having a positive electrical charge are obtained. Examples include diallyl dimethyl ammonium chloride, diallyl diethyl ammonium chloride, diethyl aminoethyl methacrylate, dimethyl aminoethyl methacrylate, methyl acryloyloxyethyl trimethyl ammonium sulfate, methacryloyloxyethyl trimethyl ammonium chloride and 3-(methacrylamido)-propyl trimethyl ammonium chloride and the salts of acrylic acid or methacrylic acid, more particularly sodium acrylate. In addition, amphoteric water-soluble polymers, such as the known polybetaines, polyampholytes and interpolymer complexes, may also be added to the polyacrylamide-containing compositions according to the invention. Further information on polymers of this type can be found in "Encyclopedia of Polymer Science and Engineering", Vol. 17, 1989, keyword: water-soluble polymers, more particularly pages 770 to 778.

The concentration of the individual components in the polyacrylamide-containing composition according to the invention is generally 5 to 50% by weight and preferably 10 to 25% by weight of at least one polyacrylamide, 50 to 95% by weight and preferably 75 to 90% by weight of a viscosity-regulating additive, 0 to 20% by weight and preferably 0 to 10% by weight of at least one tackifier and 0 to 25% by weight and preferably 5 to 15% by weight of at least one water-soluble or water-dispersible thinning agents.

The present invention also relates to non-waving adhesive compositions, more particularly spray adhesives and paper adhesives, which contain the polyacrylamide composition mentioned above, i.e. 5 to 50% by weight and preferably 10 to 25% by weight of at least one polyacrylamide, 50 to 95% by weight and preferably 75 to 90% by weight of at least one viscosity-regulating additive, 0 to 30% by weight and preferably 0 to 15% by weight of at least one tackifier, 0 to 10% by weight and preferably 0 to 5% by weight of a water-soluble or water-dispersible thinning agent and 0 to 35% by weight and preferably 0 to 25% by weight of at least one propellent.

The polyacrylamide-containing compositions according to the invention are obtained by subjecting acrylamide to solution polymerization, optionally in the presence of comonomers, and removing the excess water by methods known per se. For the applications according to the invention, the copolymer predominantly containing acrylamide is then further processed together with the viscosity-regulating additive and other auxiliaries and additives to form ready-to-apply solutions, the content of polyacrylamide and its copolymers in the case of surface application, for example by brushing or pump-spraying, generally being from 5 to 50% by weight, based on the ready-to-use solution. Where the polyacrylamide composition is applied in this way, water is preferably used as the main additive providing no water-absorbing articles are present.

Where the composition is used in adhesives of relatively low water content, glycerol is used as a further additive in a quantity of up to 25% by weight, based on the solution as a whole.

The invention is illustrated by the following Examples.

EXAMPLES

Example 1
Synthesis of a Low Molecular Weight Polyacrylamide 10.1 g of Natrosol 250 G (a hydroxyethyl cellulose marketed by Hercules Inc.) are dissolved while stirring in 270 g of demineralized water. 675 g of acrylamide and 3.4 g of azoisobutyrodinitrile are successively dissolved in 2,470 g of isopropanol and the resulting solution is added to the aqueous solution. 200 g of dry ice are added. After it has evaporated, the reaction mixture is heated to 60° C. After the polymerization reaction has started, as clearly reflected in the clouding of the solution, the heat of reaction leads to an increase in temperature. The internal temperature is kept below 70° C. by external cooling. After the exothermic reaction has abated, the reaction mixture is stirred for 1 hour at 75° C.

The reaction mixture is then cooled to room temperature, the solvent mixture is decanted off from the powder formed and the residue is dried in a water jet vacuum at 60° C.

670 g of a white free-flowing powder with a specific viscosity of 0.45 (1% solution in 1-normal aqueous sodium nitrate solution) are obtained in this way.

Application Example 1

A 15% aqueous solution of the polyacrylamide produced in accordance with Example 1 was sprayed in a thin layer onto a 50 mm×80 mm×4 mm plate of three-ply beech plywood by three strokes from a commercial pump spray can held at a distance of about 10 cm. Two wood plates were brought into contact with a 2 cm overlap on the narrow sides, fixed with four clothes pegs and, after 16 hours, were tensile-tested in a Zwick tensile tester (traction rate 15 mm/min.).

Where fixing is carried out immediately, an average tensile shear strength of 2.8 N/mm$^2$ is obtained; where fixing is carried out after airing for 5 minutes, an average tensile shear strength of 5 N/mm$^2$ is obtained.

Polymers containing 5% by weight of diethyl aminoethyl methacryl sulfate (DMAEMA) or 5% by weight of sodium acrylate show comparable strengths.

Application Example 2 (Comparison)

A relatively high molecular weight polyacrylamide (molecular weight 15,000 g/mole determined by GPC), which had a specific viscosity of 19.0 in the form of a 1% solution in 1-normal sodium nitrate solution, was investigated at the same time as the above-mentioned polyacrylamides according to the invention. With this known relatively high molecular weight polyacrylamide, a Brookfield viscosity of 3,000 mPas practicable for spray application is only obtained at a distinctly lower polymer content of 5% by weight. Accordingly, spray application was not possible in the case of the relatively high molecular weight type, even after fairly heavy dilution.

In order to demonstrate the range of application of the polyacrylamide compositions according to the invention, the other Application Examples according to the invention summarized in Table 1 below (formulations 2 to 6) were prepared and compared with market products, such as contact adhesives based on polychlorobutadiene in aqueous solvents with added resins (Pattex®) and conventional casein dispersions (Optal 702 and Optal 1740).

It can be seen from Table 1 below that the adhesive compositions according to the invention have a higher tensile shear strength than conventional casein dispersions and show adequate adhesive strength and tensile shear strength against Pattex® despite a lower solids content. The waving of paper was visually evaluated, the symbol "—" signifying very serious waving, the symbol "-" significant waving, the symbol "+-" average waving, the symbol "+" relatively little waving and the "++" very little waving.

water-containing commercial products, such as adhesives based on polyurethane (Pattex® Alleskleber [all-purpose adhesive]), casein dispersions (Optal® 1740) and adhesives based on maltodextrin (Pritt Pen). The tackifier used in the following Table is a liquid balsam resin which is marketed under the name of Flexin® D.

It can be seen from Table 2 below that the adhesive composition according to the invention is comparable in its adhesive strength to these market products for a distinctly lower viscosity and produces only slight waving comparable with conventional casein/starch dispersions.

| Substance | Solids (%) | Water (%) | Additives (%) | Adhesive strength (paper/paper) | Waving | TSS wood/wood (N/mm$^2$) |
|---|---|---|---|---|---|---|
| POLYACRYLAMIDE | | | | | | |
| #2 | 12 | 88 | — | +/- | -- | 1 |
| #3 | 23 | 77 | — | ++ | - | 4.4 |
| #4 | 50 | 50 | — | ++ | - | 4.4 |
| #5 | 15 | — | 85 (Glycerol) | - | Strikes through | 0 |
| #6 | 15 | 50 | 20 (Glycerol) | +/- | + | 0 |
| PATTEX ##2 | 35 | 65 | — | ++ | -- | 6.8 |
| OPTAL 702 ##3 | 25 | 75 | — | ++ | -- | 4.3 |
| OPTAL 1740 ##4 | 15 | 50 | 20 (Glycerol) 15 (Tackifier) | ++ | ++ (Strikes through) | 2.5 |

(Application Examples according to the invention, No.)
(Comparison Application Examples, No.)

Table 2 below compares other Examples according to the invention (formulations 7 to 14) with other conventional

| Substance | Solids (%) | Water (%) | Additives (%) | Viscosity (mPas) | Adhesive strength (paper/paper) | Waving | Wood/wood (N/mm$^2$) | Wood/PVC (N/mm$^2$) | Wood/Fe (N/mm$^2$) | WSF (° C.) |
|---|---|---|---|---|---|---|---|---|---|---|
| PAA #7 0.5% AIBN) | 23 | 77 | | 100 | ++ | - | 4.4 | 0 | 0 | 200 |
| #8 | 15 | 35 | 20 (Glycerol) 30 (Tackifier) | 520 | +/- | ++ | 1.58 | | | 70 |
| #9 | 20 | 46.7 | 33.3 (Glycerol) | 500 | ++ | ++ | 0.35 | 0.2 | 0.1 | 50 |
| #10 | 20 | 60 | 20 (Glycerol) | | ++ | ++ | 3.93 | | | |
| #11 | 20 | 70 | 10 (Glycerol) | 150 | ++ | ++ | 2.1 | 0 | 0 | 165 |
| PAA #12 (1% AIBN) | 23 | 77 | | 60 | ++ | -- | 2.5 | 0 | 0 | 200 |
| #13 | 20 | 70 | 10 (Glycerol) | 120 | ++ | ++ | 2.2 | 0 | 0 | 125 |
| #14 | 20 | 46.7 | 33.3 (Glycerol) | 300 | ++ | ++ | 0 | 0 | 0 | 0 |
| Pattex Alleskleber ##2 | 35 | 65 | | 6000 | ++ | -- | 6.75 | 3.6 | 4.7 | 74 |
| Optal 1740 ##4 | 15 | 50 | 20 (Glycerol) 15 (Tackifier) | 40000 | ++ | ++ | 2.5 | 0.4 | 1.5 | 52 |
| Pritt Pen ##5 | 70 | 30 | | 7600 | ++ | + | 1.73 | 0 | 0 | 200 | and ## as in Table 1

To test the range of application of the polyacrylamide compositions according to the invention against solvent-containing commercial products, a) 102.3 g of a polyacrylamide with a molecular weight of 4,011 g/mole (weight average 14,033; solvent water; standard: polyethylene glycol) (13% by weight) were mixed with b) 637.4 g of water (81% by weight) and with c) 47.2 g of glycerol (6% by weight) to form a solution with a Brookfield viscosity at 27° C. of 56 mPas. This solution was poured into a Poly-Swing pump bottle and was designated Example 15 in the test described hereinafter.

Solvent-containing products of 3M Deutschland GmbH with the product name "Photomount", product number 203A27GB5, in a propellent-containing spray can were used for comparison (comparison product 6). Another solvent-containing product was Tesa Technicoll Sprühkleber of Beiersdorf AG which was also applied from a propellent-gas-containing spray can (comparison product 7).

The data set out in Table 3 below show that the product according to the invention has improved adhesive strength after 24 hours by comparison with solvent-containing products, the setting time compared with the solvent-containing product (comparison product 6) being shorter by a factor of 9, but can be varied by addition of glycerol.

| Substance | #15 | ##6 | ##7 |
| --- | --- | --- | --- |
| Spray pattern (distance ca. 15 cm) | Large area | Elliptical | Large area |
| Odor | Neutral | Organic, even after 7 days | Short-lived, slightly organic |
| Strike-through | No | Yes | Yes, mainly on the application side |
| Adhesive strength after 24 h paper-to-paper, sprayed 6 times with a total of about 0.5 g solution | Paper tears > 80% | Paper tears ca. 50% | Paper tears ca. 70% |
| Waving after 24 h paper-to-paper, sprayed 6 times with a total of about 0.5 g of solution | Slight waving present | None | None |
| Tensile shear strength (wood/wood) sprayed 6 times with a total of about 0.5 g of solution, value after 7 days | 0.72 N/mm$^2$ | 1.27 N/mm$^2$ | 0.55 N/mm$^2$ |
| Setting time (time before paper tears), 6x spray application of about 0.5 g | About 8 mins. | About 75 mins. | 240 mins. |

To demonstrate the influence of the glycerol content on the pot life of the polyacrylamide compositions according to the invention, a mixture containing 20% by weight (based on the solution as a whole) of a polyacrylamide having a molecular weight as defined in Example 15 was prepared. Increasing quantities of glycerol and, for the rest, water were added to this composition. The pot lives obtained are set out in Table 4 below:

| Substance | Polyacrylamide | Glycerol | Water | Pot life (mins.) |
| --- | --- | --- | --- | --- |
| #16 | 20 | 10 | 70 | 1.5 |
| #17 | 20 | 20 | 60 | 5 |
| #18 | 20 | 30 | 50 | 23 |

As in Table 1

What is claimed is:

1. An adhesive which does not cause waviness in paper or surface finishing composition comprising:

about 5 to about 50% by weight of at least one polyacrylamide, wherein said polyacrylamide has a molecular weight of about 2,000 to about 8,000 g/mole, as determined by gel permeation chromatography, and a Brookfield viscosity of about 5 to about 500 mPas when in the form of a 15% by weight aqueous solution at 25° C.;

about 50 to about 95% by weight of at least one aqueous viscosity-regulating additive, comprising 5 to 30% by weight of an alcohol;

0 to about 30% by weight of at least one tackifier;

0 to about 25% by weight of a water-soluble or water-dispersible thinning agent; and 0 to about 35% by weight of at least one propellent.

2. The polyacrylamide composition of claim 1 comprising:

about 10 to about 25% by weight of at least one polyacrylamide;

about 75 to about 90% by weight of at least one viscosity-regulating additive;

0 to about 15% by weight of at least one tackifier;

5 to about 15% by weight of a water-soluble or water-dispersible thinning agent; and 0 to about 25% by weight of at least one propellent.

3. The composition of claim 1, wherein the viscosity-regulating additive is selected from the group consisting of water, monohydric alcohols, polyhydric alcohols and mixtures thereof.

4. The composition of claim 3, wherein the polyhydric alcohol is selected from the group consisting of ethane-1,2-diol, propane-1,2-diol, propane-1,2,3 triol and mixtures thereof.

5. The composition of claim 1, wherein said composition comprises a colophony resin.

6. The composition of claim 1, wherein said composition comprises a saponified derivative of a colophony resin.

7. The composition of claim 1, wherein the polyacrylamide is a copolymer predominantly comprising acrylamide.

8. The composition of claim 7, wherein the polyacrylamide is a copolymer predominantly comprising acrylamide with a copolymer content of up to about 15% by weight.

9. The composition of claim 8, wherein the polyacrylamide is a copolymer predominantly comprising acrylamide with a copolymer content of up to about 5% by weight.

10. A process for the surface bonding of and/or to water-absorbing or hard surfaces comprising:

a) forming an adhesive composition comprising:

about 5 to about 50% by weight of at least one polyacrylamide, wherein said polyacrylamide has a molecular weight of about 2,000 to about 8,000 g/mole, as determined by gel permeation chromatography, and a Brookfield viscosity of about 5 to about 500 mPas when in the form of a 15% by weight aqueous solution at 25° C.;

about 50 to about 95% by weight of at least one viscosity-regulating additive;

0 to about 30% by weight of at least one tackifier;

0 to about 10% by weight of a water-soluble or water-dispersible thinning agent; and 0 to about 35% by weight of at least one propellent; and b) applying said adhesive composition to said surface to be bonded.

11. The process of claim 10, wherein application of the adhesive composition to said surface comprises brushing or spraying.

12. A process for the non-slip finishing of plastic surfaces comprising:

a) forming a non-slip finish comprising:

about 5 to about 50% by weight of at least one polyacrylamide, wherein said polyacrylamide has a molecular weight of about 2,000 to about 8,000 g/mole, as determined by gel permeation chromatography, and a Brookfield viscosity of about 5 to about 500 mPas when in the form of a 15% by weight aqueous solution at 25° C.;

about 50 to about 95% by weight of at least one viscosity-regulating additive;

0 to about 30% by weight of at least one tackifier;

0 to about 25% by weight of a water-soluble or water-dispersible thinning agent; and 0 to about 35% by weight of at least one propellent;

b) applying said composition to said plastic surfaces; and c) allowing the composition to dry before bringing said plastic surfaces into contact.

13. The process of claim 12 wherein the plastic surfaces are selected from the group consisting of polystyrene, polycarbonate, polyvinyl chloride, polyethylene, polypropylene and polyethylene terephthalate.

* * * * *

UNITED STATES PATENT AND TRADEMARK OFFICE
CERTIFICATE OF CORRECTION

PATENT NO.    : 6,180,705 B1
DATED         : January 30, 2001
INVENTOR(S)   : Huebner et al.

It is certified that error appears in the above-identified patent and that said Letters Patent is hereby corrected as shown below:

<u>Title page,</u>
Item [57], ABSTRACT,
Line 5, delete "15%", and insert therefor -- 15 wt% --.

Signed and Sealed this

Twenty-fifth Day of March, 2003

JAMES E. ROGAN
*Director of the United States Patent and Trademark Office*